(12) United States Patent
Schmalnauer et al.

(10) Patent No.: US 9,641,079 B2
(45) Date of Patent: May 2, 2017

(54) DUAL BUCK-BOOST DC/DC CONVERTER

(71) Applicant: FRONIUS INTERNATIONAL GmbH, Pettenbach (AT)

(72) Inventors: Andreas Schmalnauer, Linz (AT); Thomas Kroesswang-Ridler, Wels (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 43 days.

(21) Appl. No.: 14/848,738

(22) Filed: Sep. 9, 2015

(65) Prior Publication Data

US 2016/0072387 A1 Mar. 10, 2016

(30) Foreign Application Priority Data

Sep. 10, 2014 (AT) .............................. A 50627/2014

(51) Int. Cl.
*H02M 3/158* (2006.01)
*H02M 1/00* (2006.01)

(52) U.S. Cl.
CPC .......... *H02M 3/1582* (2013.01); *H02M 3/158* (2013.01); *H02M 2001/0058* (2013.01); *H02M 2003/1586* (2013.01); *Y02B 70/1491* (2013.01)

(58) Field of Classification Search
CPC ...... H02M 3/156; H02M 3/158; H02M 5/1582
USPC ........................................ 323/222, 271, 282
See application file for complete search history.

(56) References Cited

U.S. PATENT DOCUMENTS

| | | | |
|---|---|---|---|
| 9,419,522 B1 * | 8/2016 | Khaligh | H02M 3/1582 |
| 2002/0000795 A1 | 1/2002 | Wittenbreder, Jr. | |
| 2007/0109822 A1 | 5/2007 | Kuan | |
| 2009/0066311 A1 | 3/2009 | Luerkens | |
| 2009/0278496 A1 | 11/2009 | Nakao et al. | |
| 2011/0181261 A1 | 7/2011 | Kalechshtein | |

(Continued)

FOREIGN PATENT DOCUMENTS

| | | |
|---|---|---|
| DE | 102014210347 A1 | 12/2014 |
| DE | 102013216213 | 2/2015 |
| WO | 2011089483 | 7/2011 |

OTHER PUBLICATIONS

Videau et al., "A Non-isolated DC-DC Converter with InterCell Transformer for Buck-type or Boost-type Application Requiring High Voltage Ratio and High Efficiency", PCIM Europe, Nuremberg, May 14-16, 2013, pp. 1452-1459.

*Primary Examiner* — Jeffrey Sterrett

(74) *Attorney, Agent, or Firm* — Greenblum & Bernstein, P.L.C.

(57) ABSTRACT

For a DC/DC converter with high dynamics and for high-voltage conditions, a provision is made that a capacitor series connection (2) of at least three capacitors (C1, C2, C3) is provided in the DC/DC converter (1), a first capacitor (C1) and middle third capacitor (C3) of the capacitor series connection (2) being part of a first inverting buck-boost converter (7) and a second capacitor (C2) and the middle third capacitor (C2) of the capacitor series connection (2) being part of a second inverting buck-boost converter (8), and that the first direct-current voltage ($U_{IN}$) is applied to the capacitor series connection (2) and the second direct-current voltage ($U_{OUT}$) is applied to the common third capacitor (C3) of the first and second inverting buck-boost converter (7, 8).

15 Claims, 5 Drawing Sheets

(56) References Cited

U.S. PATENT DOCUMENTS

| | | | |
|---|---|---|---|
| 2014/0361619 A1 | 12/2014 | Ohnuki | |
| 2015/0035360 A1* | 2/2015 | Marbach | H02J 7/0052 307/23 |
| 2016/0072387 A1* | 3/2016 | Schmalnauer | H02M 3/158 323/271 |

* cited by examiner

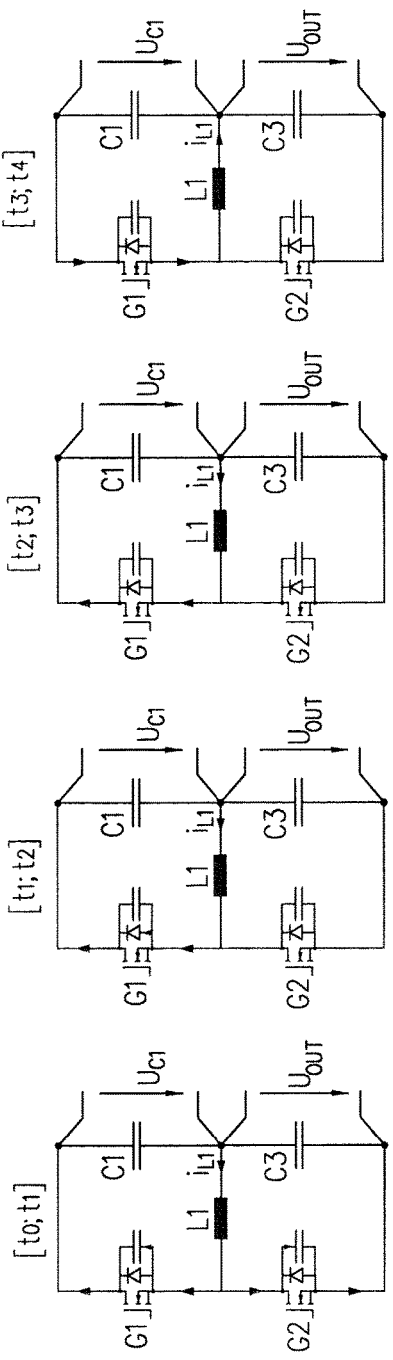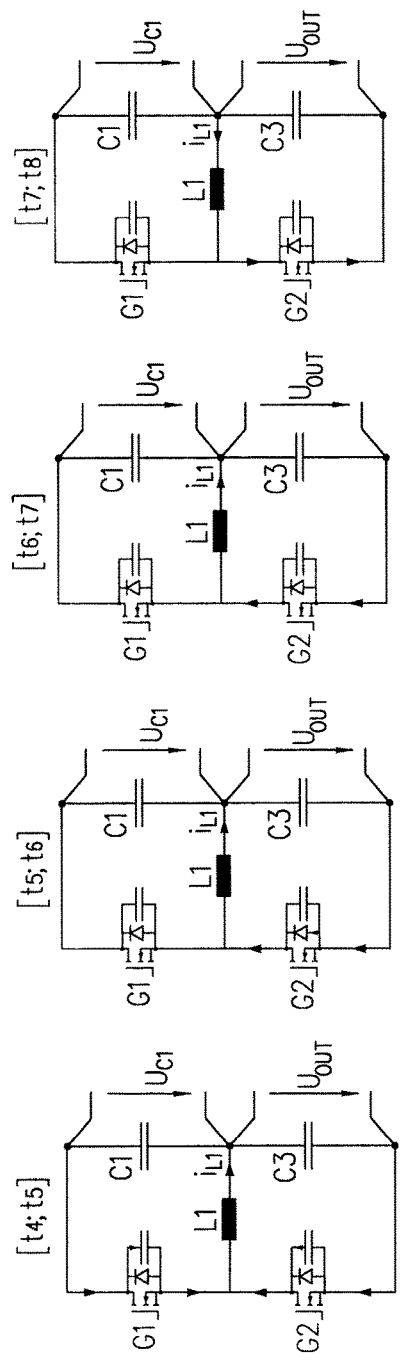

DUAL BUCK-BOOST DC/DC CONVERTER

The present application claims priority under 35 U.S.C. §119(a) of Austrian Patent Application No. A50627/2014 filed Sep. 10, 2014, the disclosure of which is expressly incorporated by reference herein in its entirety.

The present invention relates to a DC/DC converter for converting a first direct-current voltage into a second direct-current voltage and a method for regulating such a DC/DC converter, wherein a capacitor series connection of at least three capacitors is provided in the DC/DC converter, wherein a first capacitor and middle third capacitor of the capacitor series connection are part of a first inverting buck-boost converter and a second capacitor and the middle third capacitor of the capacitor series connection are part of a second inverting buck-boost converter.

In many areas of application, it is necessary to convert a high direct-current voltage, e.g., a voltage from 330 V to 1000 V, to a much lower direct-current voltage, e.g., a voltage from 40 V to 60 V, that is, a voltage that is smaller by a factor in the range of 10. In bidirectional direct-current voltage converters (DC/DC converters), conversion is also done the other way around. This occurs in battery charging stations, for example, in which several battery charging devices are connected to a common DC intermediate circuit with a high direct-current voltage and are supplied by the intermediate circuit or supply electric power to the intermediate circuit. These requirements are very difficult to meet using today's technology on semiconductor switches, e.g., a MOSFET (Metal Oxide Semiconductor Field Effect Transistor) or an IGBT (Insulated Gate Bipolar Transistor), such as those that are used in DC/DC converters.

As is known, the resistivity of a MOSFET increases as the withstand voltage rises—and hence the conduction losses along with it. When such high voltages—and therefore high withstand voltages as well—are required, significant conduction losses and thus substantial losses in efficiency would occur in cost-effective standard MOSFETs. Moreover, elaborate cooling concepts would need to be implemented in order to conduct away power losses and prevent overheating of the power electronics. This is why standard MOSFETs cannot be used when the requirements are this high. Cost-effective standard IGBTs can also be ruled out, since the high turn-off losses of the IGBTs cannot be eliminated, even using soft-switching concepts such as Zero Voltage Switching (ZVS) or Zero Current Switching (ZCS), for example. The use of a DC/DC converter for these lofty requirements with SiC (silicon cabide) MOSFETs would be technically feasible but very expensive, so that would not be an option for most applications.

In many areas of application, it is also necessary that ultra-short reaction times, e.g., in the range of 10 ms, are possible with the DC/DC converter for extreme load jumps. In other words, the DC/DC converter must be able to make a large jump in current within the reaction time. In a battery charging device, that occurs, for example, when switching from charging with maximum power to discharging with maximum power, as can occur in emergency power systems, for example. Similar load jumps can also occur during the feeding-in or switching-off of electrical loads of the battery system. However, the required voltage ranges also necessitate a commensurate dimensioning of the passive electrical components of the DC/DC converter, particularly of the capacitors and coils. Due to the resulting inductance values and capacity values of the installed coils and capacitors, however, this results in a high time constant $\tau$ of the electrical system ($\tau=\sqrt{LC}$), which limits the possible reaction time of the DC/DC converter.

One approach to solving the above problem is already described in "A Non-isolated DC-DC Converter with Inter-Cell Transformer for Buck-type or Boost-type Application Requiring High Voltage Ratio and High Efficiency," N. Videau, et al., PCIM Europe 2013, 14-16 May, Nuremberg, pp. 1452-1459, ISBN 973-3-8007-3505-1. The DC/DC converter for high-voltage conditions described therein consists of two bidirectional synchronous converters in buck topology. Through the stacking of a first synchronous converter on a second, mirrored synchronous converter, a common output of the two synchronous converters can be used in parallel. In this way, a doubling of the coil currents can be achieved at the output, since the coil current is part of the output current at all time points in a synchronous converter. Through the direct power transfer of the synchronous converter, power is supplied to the output both during the magnetization phase of the coil and during the demagnetization phase. However, this arrangement turns out to be disadvantageous in terms of the input of the DC/DC converter. Synchronous converters have the known characteristic that the input and output voltage have the same sign. The input of the DC/DC converter is thus composed of the two inputs of the stacked synchronous converters, which are interconnected by the common output. However, the output has inverse poling in this arrangement, for which reason the positive input current acts as a negative component on the output side. During normal operation, this negative component is completely compensated by the coil currents and reduces the output current by the relatively low input current. This circumstance is disadvantageous, however, in the case of dynamic effects and voltage surges, which leads to high capacitor currents and manifests itself in a clear output-side voltage dip. This can have a harmful effect on signal and control electronics. Moreover, as a result of the topology, more than half of the input voltage (specifically, half of the input voltage+output voltage) is applied to the capacitors of the DC/DC converter during operation of the DC/DC converter. Consequently, the two capacitors must also have a corresponding withstand voltage. At high input voltages (≥1000 V), that can become problematic, however, since—in electrolyte condensers, for example—the withstand voltage is limited to 500 V due to voltage technology. Therefore, such a DC/DC converter cannot be used at all for large input voltages with electrolyte condensers. DE 10 2013 2016 231 A1 describes a three-phase multipoint rectifier with a rectifier intermediate circuit and three serial capacitors. The aim here is to render the voltages applied to the capacitors symmetrical in order to maintain the output voltages, which are tapped in a stepwise manner, constant.

It is the object of the present invention to provide a DC/DC converter that can be implemented in a cost-effective manner for high-voltage conditions and permits short reaction times while avoiding the drawbacks of the known prior art.

This object is achieved for the DC/DC converter through the provision in the DC/DC converter of a capacitor series connection of at least three capacitors, wherein a first and middle third capacitor of the capacitor series connection is part of a first inverting buck-boost converter and a second and the middle third capacitor of the capacitor series connection are part of a second inverting buck-boost converter, and the first direct-current voltage is applied to the capacitor series connection and the second direct-current voltage is applied to the common third capacitor of the first and second inverting buck-boost converter. Through this circuit, a stacked and symmetrical arrangement of the two inverting buck-boost converters, which share the middle capacitor of the capacitor series connection, is also achieved. However, the functional principle of inverting buck-boost converters is based on indirect power transfer. During the magnetization phase of the coil, the power input of the inverting buck-boost converter is temporarily stored in the coil and supplied to the output during the demagnetization phase. Through the stacking of a first inverting buck-boost converter onto a second, mirrored inverting buck-boost converter, a common output can be used in parallel. As a result, it is possible to implement a doubling of the current of the coil currents during the respective demagnetization phase on the output side for the DC/DC converter according to the invention. By virtue of the inverting function of the inverting buck-boost converter, the input current is additionally added as a positive partial current. This positive component fully compensates (100%) for the smaller output currents of the inverting buck-boost converter that are not transferred to the output during the magnetization phase. However, the DC/DC converter according to the invention proves to be particularly advantageous with respect to the input. The input of the DC/DC converter according to the invention is composed of the two inputs of the inverting buck-boost converters and the common output of the two inverting buck-boost converters at the common middle capacitor. A classic capacitor series connection with overlapping power transfer is thus possible. The dynamic effects act uniformly according to the capacitative ratio, so that the output voltage does not change substantially. What is more, by virtue of its topology, the DC/DC converter always has less than half of the input voltage (specifically, half of input voltage-output voltage) being applied to its capacitors during operation. The required withstand voltage of the capacitors can thus be reduced. As a result, it is possible to use electrolyte capacitors even in the case of high input voltages (1000 V) through halving and subtraction, particularly even at higher output voltages than in the prior art. In summary, it is therefore a substantial advantage that the output power remains unchanged compared to the DC/DC converter according to the prior art with a lower withstand voltage of the capacitors of the DC/DC converter according to the invention. Not least, in the DC/DC converter according to the invention, the current load on the capacitors of the capacitor series connection is also substantially lower. The DC/DC converter according to the invention can thus also be realized in a cost-effective manner with standard components.

If the capacitance of the third capacitor is greater than, particularly at least twice as large as the sum of the capacitances of the first and of the second capacitor, then the effects of transient events, such as switch-on processes or load jumps, for example, can advantageously be reduced even in the case of higher voltage ratios. Applications in which the output voltage is converted to one-tenth of the input voltage are thus also possible. In general, an adjustment of the capacitor can be advantageous starting at a voltage ratio of greater than 1 to 3. Any voltage peaks that occur are reduced according to the capacitance ratio of the third capacitor to the sum of the capacitances. Overloading of the components or of the following circuit, which can lead to a shortening of the service life or even possibly to a defect, can thus be prevented even at high voltage ratios. This can enable the use of the DC/DC converter according to the invention even for battery charging stations in which a voltage ratio of greater than 1 to 10 can be necessary, for example.

Preferably, to form the first inverting buck-boost converter, a bridge circuit composed of a switch series circuit with at least one first and second semiconductor switch, a series connection composed of first and third capacitor and an electrical connection as a bridge arm in which a first coil is arranged and, to form the second inverting buck-boost converter, a bridge circuit composed of a switch series circuit with at least one third and fourth semiconductor switch, a series connection composed of second and third capacitor and an electrical connection as a bridge arm in which a second coil is arranged. This results in an especially simple circuit structure of the two inverting buck-boost converters.

If the first and second capacitor are selected so as to be of equal size, then the first direct-current voltage of the DC/DC converter is divided uniformly to the two inverting buck-boost converters, whereby the latter are loaded equally, resulting in substantially lower demands on the withstand voltage of the semiconductor switches of the inverting buck-boost converters. This also increases the efficiency of the DC/DC converter.

The method according to the invention for a DC/DC converter for converting a first direct-current voltage into a second direct-current voltage, and vice versa, in which the second direct-current voltage is applied to a capacitor and two DC/DC converter units, each with at least one coil, at least two semiconductor switches and at least one capacitor, are arranged in the DC/DC converter and the two DC/DC converter units are interconnected as a result of the two DC/DC converter units sharing the capacitor to which the second direct-current voltage is applied, the semiconductor switches of the DC/DC converter units being switched alternatingly during successive switching periods, is characterized in that minimum current values and maximum current values are prescribed for the coil currents via the coils of the DC/DC converter units, the minimum current values and maximum current values having different signs and the switching of the semiconductor switches of the DC/DC converter units being triggered when the associated minimum current value or maximum current value is reached by the respective coil current. The current values of the coil currents are advantageously determined by appropriate measuring means, for example with Hall sensors, current shunts or the like. As a result of the zero crossing of the coil currents forced in this way, soft switching of the semiconductor switches is forced, which reduces the switching losses of the DC/DC converter and increases the efficiency of the DC/DC converter.

For this purpose, the semiconductor switches are preferably switched on after a respective antiparallel semiconductor switch diode has become conductive, and the semiconductor switches are preferably switched off when the associated minimum current value or maximum current value is reached. This enables an especially simple implementation in a control method for controlling the DC/DC converter.

A predetermined output current or a predetermined direct-current voltage at the output of the DC/DC converter can easily be set if the minimum current values and/or the maximum current values are predetermined accordingly. This also makes a simple control method for the DC/DC converter possible.

It is especially advantageous if the semiconductor switches of the two DC/DC converter units are actuated in a phase-shifted manner, since the resulting current fluctuations of the output current can be reduced substantially in this way.

If the first semiconductor switch is switched on alternatingly with the second semiconductor switch and the third semiconductor switch is switched on alternatingly with the fourth semiconductor switch, this results in a discontinuous operation, and ZVS (Zero Voltage Switching) is possible for all switching processes. There are therefore almost no switching losses and the control is both simple and robust.

If it is ensured that the semiconductor switches are switched such that at least the second semiconductor switch or the fourth semiconductor switch is always conductive, this results in a higher possible voltage transformation ratio, since the second or fourth semiconductor switch is switched on longer. This also results in overlapping switch-on times of the second semiconductor switch and fourth semiconductor switch in case of a phase shift.

The present invention is explained in further detail below with reference to FIGS. 1 to 12, which show, schematically and in a non-limitative manner, advantageous embodiments of the invention.

FIGS. 2 to 9 show the switching states of the semiconductor switches of the DC/DC converter during a switching period.

Figure 1:
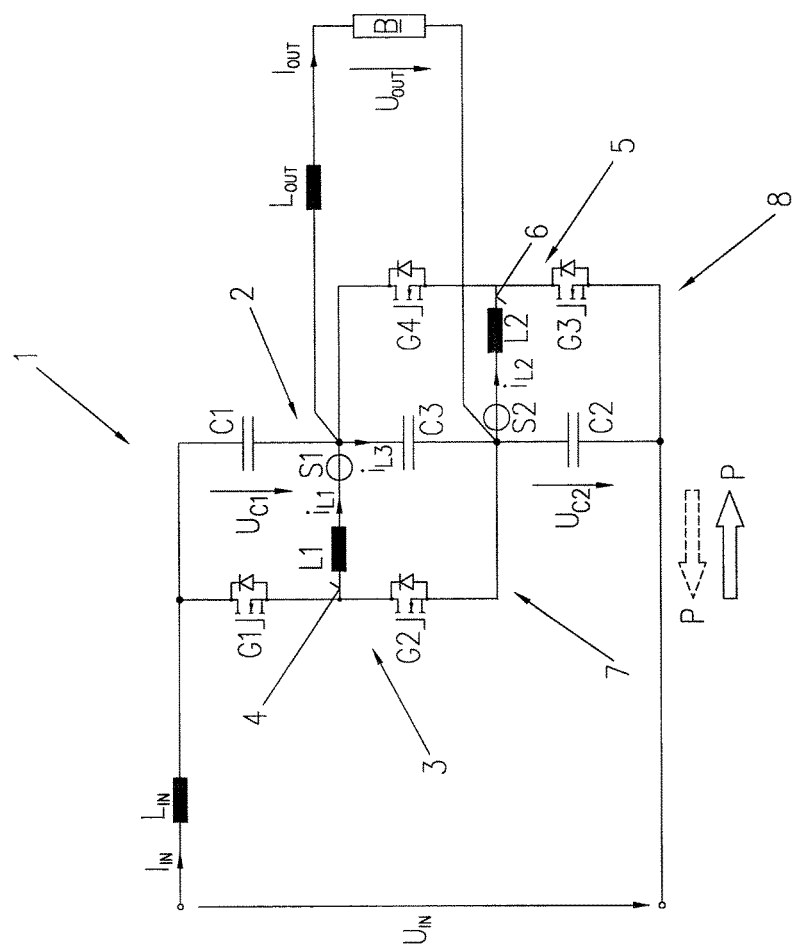
FIG. 1 shows a DC/DC converter according to the invention.

FIG. 1 shows a DC/DC converter according to the invention 1, without galvanic isolation, for converting a first direct-current voltage $U_{IN}$ at the input of the DC/DC converter 1 into a second direct-current voltage $U_{OUT}$ at the output of the DC/DC converter 1, which is applied to an electrical load B. During operation, the electrical load B draws an output current $I_{OUT}$ (to charge a battery, for example), which causes an input current $I_{IN}$ into the DC/DC converter 1 that is taken off, for example, from a DC intermediate circuit (not shown). In the input arm and/or in the output arm, a filter coil $L_{IN}$, $L_{OUT}$ can also be provided in a known manner in order to reduce current fluctuations. The DC/DC converter according to the invention 1 is bidirectional, so input and output and thus the direction of the flow of current or power P can also be reversed, as indicated in FIG. 1. If the direction of the flow of power is reversed, electric energy would flow from the load B, such as a battery, for example, into an intermediate circuit, such as a photovoltaic inverter, for example, at the input. According to this example, the photovoltaic inverter can thus supply consumers via the battery. In FIG. 1, the DC/DC converter 1 works as a step-down converter, which is to say that the second direct-current voltage $U_{OUT}$ is smaller than the first direct-current voltage $U_{IN}$. In the reverse direction, the DC/DC converter 1 thus works as a step-up converter. In this case, the input voltage would be the second direct-current voltage $U_{OUT}$, and the output voltage would be the first direct-current voltage $U_{IN}$, with the same applying analogously to the input and output current. For the sake of simplicity, however, the function of the DC/DC converter 1 is only described for the direction of flow as shown in FIG. 1, but the following explanations apply analogously to the reverse operation with switched input and output.

The DC/DC converter 1 consists of a capacitor series connection 2 of at least three capacitors C1, C2, C3, with a first direct-current voltage $U_{IN}$ being applied to the capacitor series connection 2 as input voltage. The capacitor series connection 2 thus constitutes a capacitive voltage divider that divides the first direct-current voltage $U_{IN}$ to the capacitors C1, C2, C3 of the capacitor series connection 2. A second direct-current voltage $U_{OUT}$ is applied to the middle third capacitor C3 of the capacitor series connection 2 that is picked off here as output voltage of the DC/DC converter 1. A capacitor series connection 2 is understood as being an interconnection of capacitors in which equally poled voltages $U_{C1}$, $U_{C2}$, $U_{OUT}$ are applied to all capacitors C1, C2, C3 of the capacitor series connection 2. An interconnection of capacitors in which differently poled voltages are applied to the capacitors (like in the prior art cited at the outset, for example) is not understood as a series connection of capacitors in terms of the invention.

A first switch series circuit 3 consisting of two series-connected semiconductor switches G1, G2 is connected parallel to the series-connected first and middle third capacitor C1, C3 of the capacitor series connection 2. Accordingly, the capacitor C1 is used to stabilize the first direct-current voltage $U_{IN}$. A first electrical connection 4 in which a first coil L1 is arranged branches off between first and second semiconductor switches G1, G2 of the first switch series circuit 3. This first electrical connection 4 is connected to the capacitor series connection 2 between first and middle third capacitor C1, C3. This bridge circuit composed of first switch series circuit 3, first and middle third capacitor C1, C3 of the capacitor series connection 2 and of the electrical connection 4 with the coil L1 as a bridge arm forms a sufficiently known first bidirectional inverting buck-boost converter 7.

A second switch series circuit 5 consisting of two series-connected semiconductor switches G3, G4 is connected in parallel to the series-connected second and middle third capacitor C2, C3 of the capacitor series connection 2. Accordingly, the capacitor C2 is used to stabilize the first direct-current voltage $U_{IN}$. A second electrical connection 6 in which a second coil L2 is arranged branches off between third and fourth semiconductor switches G3, G4 of the second switch series circuit 5. This second electrical connection 6 is connected to the capacitor series connection 2 between second and middle third capacitor C2, C3. This bridge circuit composed of second switch series circuit 5, second and middle third capacitor C2, C3 of the capacitor series connection 2 and of the electrical connection 6 with the coil L2 as a bridge arm forms a sufficiently known second bidirectional inverting buck-boost converter 8.

What is special about the circuit of the DC/DC converter according to the invention 1 is, besides the capacitive voltage divider in the form of the capacitor series connection 2, that the two inverting buck-boost converters 7, 8 share the middle third capacitor C3 of the capacitor series connection 2. The two inverting buck-boost converters 7, 8 are thus arranged in a stacked manner, and the second inverting buck-boost converter 8 is arranged in mirrored fashion with respect to the first inverting buck-boost converter 7, thus resulting in a symmetrical circuit.

Due to the stacked arrangement and due to the capacitive voltage divider, on the condition that the capacity values of the capacitors C1, C2 are the same, the first direct-current voltage $U_{IN}$ is advantageously divided into equal parts to the two inverting buck-boost converters 7, 8 and is applied accordingly to the connecting points of C1 and C2. This inevitably results in a substantially lower required withstand voltage of the semiconductor switches G1, G2, G3, G4 of the inverting buck-boost converters 7, 8. Through the division of the voltage range of the first direct-current voltage $U_{IN}$ to the inverting buck-boost converters 7, 8, the required withstand voltage of the semiconductor switches G1, G2, G3, G4 can also be reduced accordingly, which enables the use of cost-effective standard MOSFETs and reduces the manufacturing costs of the DC/DC converter 1 according to the invention. The use of MOSFETs also enables switching without switching losses in the case of a soft switching control of the semiconductor switches G1, G2, G3, G4, as explained further below; by comparison, IGBTs have high turn-off losses. In this way, the efficiency can be increased even further. The semiconductor switches G1, G2, G3, G4 therefore have substantially lower resistivities, thus enabling a substantial reduction in conduction losses and improved efficiency. The halving of the first direct-current voltage $U_{IN}$ also brings about a doubling of the duty cycle of the control of the semiconductor switches G1, G2, G3, G4, whereby the control of the DC/DC converter 1 is also substantially improved.

By virtue of the stacked and mirrored arrangement of the inverting buck-boost converters 7, 8 of the DC/DC converter according to the invention 1, less than half of the first direct-current voltage $U_{IN}$ is also always applied to the capacitors C1, C2, and all of the capacitors C1, C2, C3 of the capacitor series connection 2 have the same poling. In this way, the required withstand voltage of the capacitors C1, C2 is reduced. Apart from that, no counter-poled voltages can occur in the circuit, which reduces the requirements for safety and protective circuitry.

If the capacitance of the third capacitor C3 is greater, particularly at least two times greater, than the sum of the capacitances of the first capacitor C1 and of the second capacitor C2, the effects of transient events such as switch-on processes or load jumps can advantageously be reduced even in the case of higher voltage ratios. With a third capacitor C3 adapted in this manner, applications in which the output voltage is converted to one-tenth of the input voltage can also be realized. In general, an adjustment of the capacitor can be advantageous starting at a voltage ratio of greater than 1 to 3. Any voltage peaks that occur are reduced according to the capacitance ratio of the third capacitor C3 to the sum of the capacitances C1, C2, C3. Overloading of the components or of the following circuit, which can lead to a shortening of the service life or even to a defect, can thus be avoided even at high voltage ratios. This can enable the use of the DC/DC converter according to the invention 1 even for battery charging stations in which a voltage ratio of greater than 1 to 10 is required, for example.

The coils L1, L2 each carry a coil current $i_{L1}$, $i_{L2}$, each of which can be determined using appropriate measuring means S1, S2.

Through the inventive connection of the DC/DC converter 1, the coil current $i_{L1}$, $i_{L2}$ of the two inverting buck-boost converters 7, 8 is also halved, since, due to the circuit, the output current $I_{out}$ arises from a superposition of the coil currents $i_{L1}$, $i_{L2}$, and other currents. In addition, through the mirrored structure of the two inverting buck-boost converters 7, 8, the full power transfer from the input to the output is guaranteed without intermediate storage. The capacitor C3 is not used here as intermediate storage for electrical power; rather, it need only take up a small alternating component of the output current, as will be explained in further detail below. This also leads to a lower current load of the capacitors C1, C2, C3.

If the inductance values of the first coil L1 and second coil L2 are selected such that the coil currents $i_{L1}$, $i_{L2}$ switch signs via the first coil L1 and second coil L2 during a switching period of the semiconductor switches G1, G2, G3, G4, all of the semiconductor switches G1, G2, G3, G4 can be switched in a low-loss manner with ZVS (Zero Voltage Switching), as will be described in detail below. The positive and negative coil currents $i_{L1}$, $i_{L2}$ within a switching period resulting from the appropriate dimensioning of the inductance values enable simple implementation of ZVS without additional components. By changing the direction of flow of the coil currents, for example when using a MOSFET after the switch-off process of the semiconductor switch G1, G2, G3, G4 that is conductive at the moment, the MOSFETs drain source capacitance is charged, whereas the drain source capacitance of the current-accepting semiconductor switch G1, G2, G3, G4 is discharged. After the recharging process, the antiparallel diode of the current-accepting semiconductor switch G1, G2, G3, G4 becomes conductive, whereby the semiconductor switch G1, G2, G3, G4 can be switched on in a voltageless manner. When using other semiconductor switches, similar recharging processes occur. The symmetrical structure of the DC/DC converter according to the invention 1 also guarantees equal efficiency for both directions of power flow P, thus ensuring maximum efficiency for the DC/DC converter 1 in both directions.

The special method for actuating the semiconductor switches G1, G2, G3, G4 is explained, which is also inherently inventive, is explained in the following.

The two inverting buck-boost converters 7, 8 could be constructed with relatively high inductance values of the coils L1, L2 in order to maintain the resulting current fluctuation $\Delta i_{L1} = \max\{i_{L1}\} - \min\{i_{L1}\}$ per switching period of the semiconductor switches G1, G2, G3, G4 within a small, specified range (the same also applies to $i_{L2}$, of course). In typical applications with such DC/DC converters 1, coils L1, L2 with inductance values in the millihenry range, e.g., L1, L2=1 mH, are used at typical switching frequencies of the semiconductor switches G1, G2, G3, G4 in the 10 kHz range, e.g., 20 kHz to 90 kHz. As a result of the resulting nearly constant coil currents $i_{L1}$, $i_{L2}$, the conduction losses of the semiconductor switches G1, G2, G3, G4 as well as the copper losses of the coils L1, L2 are minimized. On the coil side, the current fluctuations are limited by $\Delta i_{L1}$, $\Delta i_{L2}$, so no pulsed currents occur. However, switching losses pose a problem here. Depending on the power transfer, one of the semiconductor switches G1, G2, G3, G4 of the switch series circuits 3, 5 is hard-switched, i.e., at high currents. The resulting losses manifest themselves in increasing losses in efficiency and higher demands on the semiconductor switches G1, G2, G3, G4.

However, the implementation of the DC/DC converter 1 with inverting buck-boost converter 7, 8 with small inductance values of the coils L1, L2, which is inherently desirable due to the desired low time constants ($\tau = \sqrt{LC}$) of the electrical system, manifests itself in pronouncedly triangular coil currents $i_{L1}$, $i_{L2}$, and thus without countermeasures, even in a pronouncedly triangular second current $I_{OUT}$, here the output current. Low inductance values are understood here as values in the 10 µH range, that is, three orders of magnitude smaller, for example 65 µH in the switching frequency range cited above. The coil currents $i_{L1}$, $i_{L2}$ thus also accept lower current values (substantially smaller than the peak values) by virtue of the triangular shape, which makes it possible to switch the semiconductor switches G1, G2, G3, G4 at lower currents, whereby the switching losses can be reduced. Opposing the reduction of switching losses, however, is the inherently unfavorable triangular-shaped current profile of the coil currents $i_{L1}$, $i_{L2}$, and of the output current $I_{OUT}$, which is wholly undesirable in many applications, particularly for battery charging and battery discharging processes. To wit, high current fluctuations on the battery side are known to cause accelerated ageing processes within a battery. Apart from that, due to the triangular shape, the effective values of the coil currents $i_{L1}$, $i_{L2}$ are of course also higher compared to nearly constant coil currents $i_{L1}$, $i_{L2}$ with lower current fluctuations, which, in turn, bring about higher conduction losses. Although such an embodiment with small coils L1, L2 appears to be unfavorable, an advantageous control method for the DC/DC converter 1 can indeed be realized.

For this purpose, for a desired period duration of the triangular-shaped coil currents $i_{L1}$, $i_{L2}$, the inductances of the coils L1, L2 are dimensioned such that the coil currents $i_{L1}$, $i_{L2}$ are able to switch signs during the commutation phases of the semiconductor switches G1, G2, G3, G4. By changing the sign of the coil currents $i_{L1}$, $i_{L2}$, soft switching can be achieved. This is ZVS (Zero Voltage Switching), which is the primary soft switching concept due to the high voltages in the DC/DC converter 1. The commutation phases are explained in FIGS. 2 to 10 on the basis of the first inverting buck-boost converter 7, with the same applying analogously, of course, to the second inverting buck-boost converter 8 and the coil current $i_{L2}$ of the coil L2.

Figure 10:
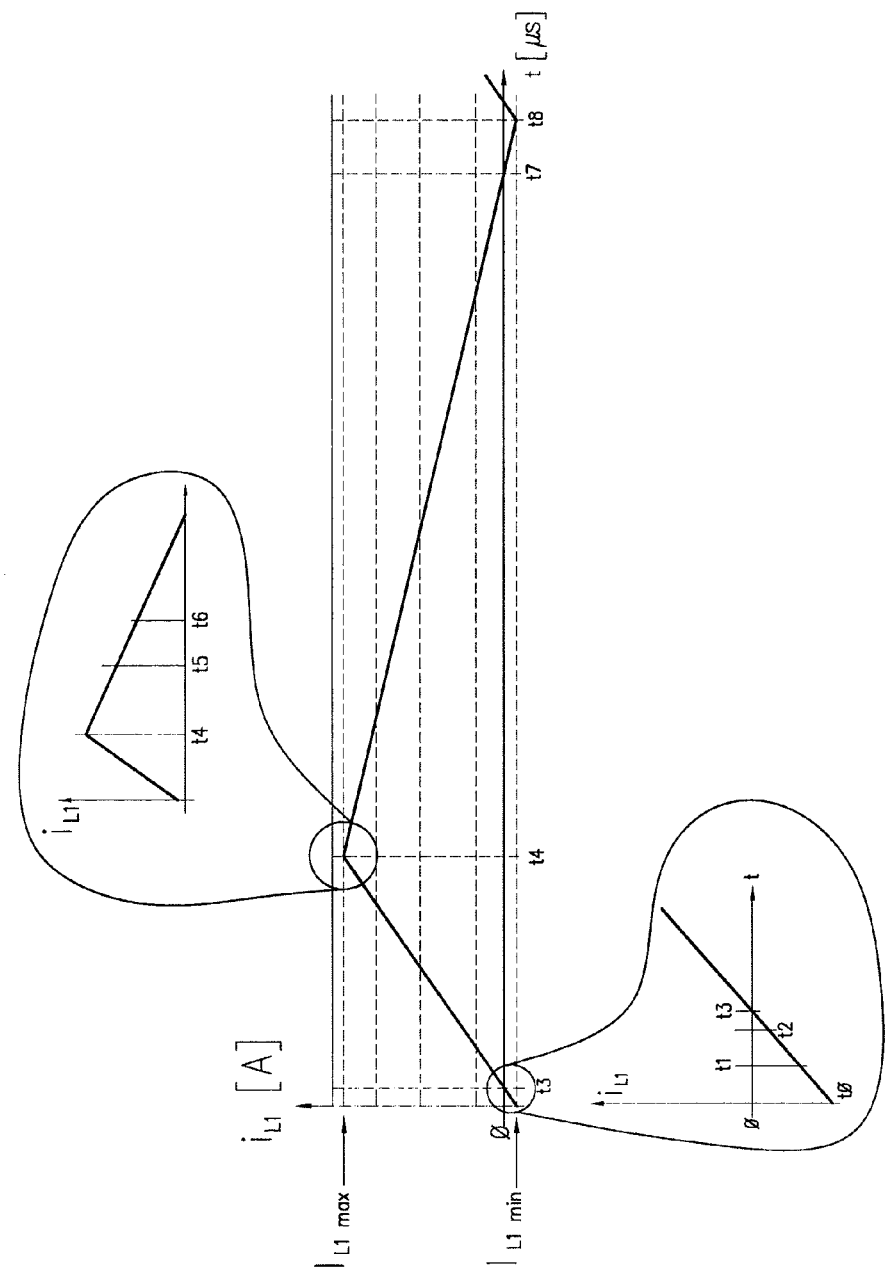
FIG. 10 shows the resulting coil current.

During the commutation phases of the semiconductor switches G1, G2, the parasitic semiconductor switching capacities (in FIG. 1, each parallel to the semiconductor switches G1, G2, G3, G4) are charged and discharged linearly (FIG. 2, time interval [t0;t1] or FIG. 6, time interval [t4;t5]) until the antiparallel semiconductor switch diode (in FIG. 1, each parallel to the semiconductor switches G1, G2, G3, G4) becomes conductive (FIG. 3, time interval [t1;t2] and FIG. 7, time interval [t5;t6]). The time point t1 or t5, at which the semiconductor switch diode becomes conductive, is determined through the coil current $i_{L1}$ (t), where t∈[t0;t1] and [t4;t5], respectively, and through the parasitic capacitance of the semiconductor switches G1, G2. Immediately thereafter, the first semiconductor switch G1 or the second semiconductor switch G2 is switched on (time point t2 or t6) and the coil current $i_{L1}$ changes its polarity during the in-phase of the semiconductor switch G1, G2 (time point t3 or t7) (FIG. 4, time interval [t2;t3] and FIG. 8, time interval [t6;t7]). The switch-on point of the semiconductor switches G1, G2 would ideally be t1 and t5, respectively. After the recharging process of the parasitic capacitances of the semiconductor switches G1, G2 is detected (e.g., through appropriately installed measuring sensors or measuring circuits that are capable of detecting such rapid recharging processes), signal processing-related delays occur, so that switching-on is performed only a short, system-dependent time period after recharging, i.e., at time points t2, t6. At changeover point t2 of the semiconductor switch G1 ZCS (Zero Current Switching) occurs in addition to ZVS, since the coil current $i_{L1}$ is zero or near zero at this time point, whereas only ZVS occurs at changeover point t6 of the semiconductor switch G2. The semiconductor switch G1, G2 remains switched on until an upper limit $i_{L1max}$ (for semiconductor switch G1) or a lower limit $i_{L1min}$ (for semiconductor switch G2; negative current) has been reached (FIG. 5, time interval [t3;t4] and FIG. 9, time interval [t7,t8]). At time point t4, or when the upper limit $i_{L1max}$ is reached, the semiconductor switch G1 is therefore switched off and, with a short delay caused by soft switching, the semiconductor switch G2 is switched on. At time point t8, or when the lower limit $i_{L1min}$ is reached, the semiconductor switch G2 is switched off and, with a short delay caused by soft switching, the semiconductor switch G1 is switched on. This switching period of the semiconductor switches G1, G2 is repeated periodically according to the switching frequency. The associated current profile of the coil current $i_{L1}$ is shown in FIG. 10. The coil current $i_{L1}$ thus oscillates during a switching period of the semiconductor switches G1, G2 of the first inverting buck-boost converter 7 with a certain period duration (t8–t0) in a triangular shape between an upper limit $i_{L1max}$ and a lower limit $i_{L1min}$, the upper limit $i_{L1max}$ and lower limit $i_{L1min}$ having different signs in order to enable ZVS.

It will be readily understood that the coils L1, L2 and the semiconductor switches G1, G2, G3, G4 of the inverting buck-boost converters 7, 8 are to be selected and dimensioned according to the switching frequency established by the period duration of the switching duration of the semiconductor switches G1, G2, G3, G4 and the expected currents and voltages.

Figure 11:
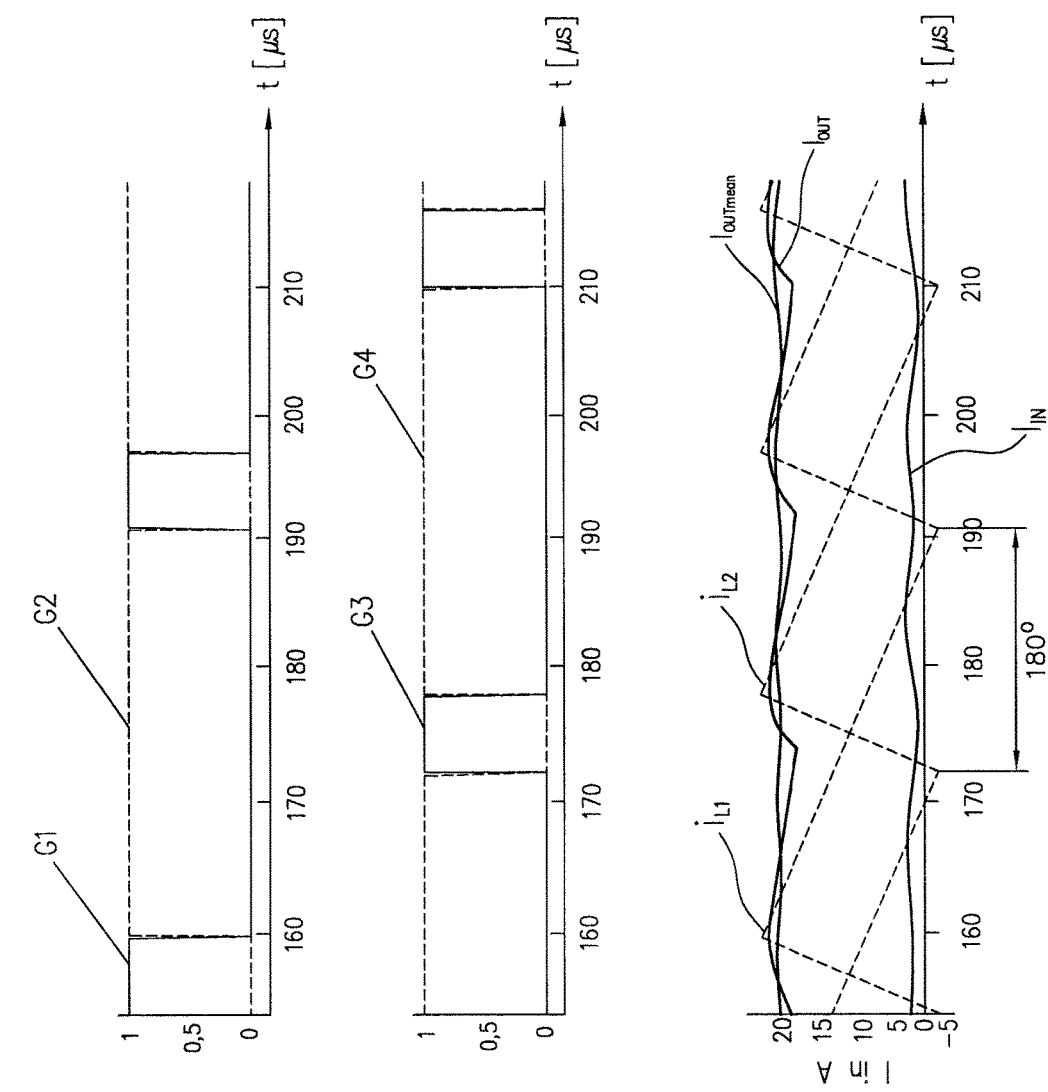
FIG. 11 shows the current profile of the coil currents and of the output current.

In order to avoid a triangular output current $I_{OUT}$ despite the triangular-shaped coil currents $i_{L1}$, $i_{L2}$, the two inverting buck-boost converters 7, 8 are preferably actuated in a phase-shifted manner, the two inverting buck-boost converters 7, 8 preferably being actuated so as to be phased-shifted by 180° in order to minimize current fluctuations. After the coil currents $i_{L1}$, $i_{L2}$ overlap at least temporarily due to the high difference in voltage between input and output, an output current $I_{OUT}$ with a small alternating component is produced that is drawn by the middle capacitor C3. With reference to the circuit as shown in FIG. 1, for the possible switching positions of the semiconductor switches G1, G2, G3, G4, a readily understandable overlapping of the coil currents $i_{L1}$, $i_{L2}$ occurs during the simultaneous on-phases of the semiconductor switches G2 and G4; in contrast, during the other switching phases, only one of the respective coil currents $i_{L1}$, $i_{L2}$ is part of the output current $I_{OUT}$:

$G2=0$ and $G4=1 \Rightarrow I_{OUT}=i_{L2}+I_{IN}$ $G2=1$ and $G4=0 \Rightarrow I_{OUT}=i_{L1}+I_{IN}$ $G2=1$ and $G4=1 \Rightarrow I_{OUT}=i_{L1}+i_{L2}+I_{IN}$ The theoretically possible switching state $G2=0$ and $G4=0$, which would lead to $I_{OUT}=I_{IN}$, never occurs due to the phase shift and the high different in voltage between input and output. Due to the high difference in voltage between the first direct-current voltage $U_{IN}$ and second direct-current voltage $U_{OUT}$, the time interval with the addition of all partial currents ($G2=1$ and $G4=1$) is predominant in each switching period of the semiconductor switches G1, G2, G3, G4. This is also shown in FIG. 11. The two upper graphs show the switching positions of the semiconductor switches G1, G2, G3, G4. The lower graph shows the current profiles of the two coil currents $i_{L1}$, $i_{L2}$ of the input current $I_{IN}$ and of the output current $I_{OUT}$ as well as of the arising middle output current $I_{OUTmean}$. As can be seen, the current fluctuation of the output current $I_{OUT}$ can be reduced substantially through the soft switching method according to the invention.

The phase shift brings not only the advantage of low fluctuation of the output current $I_{OUT}$, but rather it enables the interpretation of the capacitors C1, C2, C3 with smaller capacity values (due to the low current draw). In addition, in applications with low demands on the current fluctuation, this results in the substantial advantage that filtering of the output current $I_{OUT}$ can be completely omitted.

Figure 12:
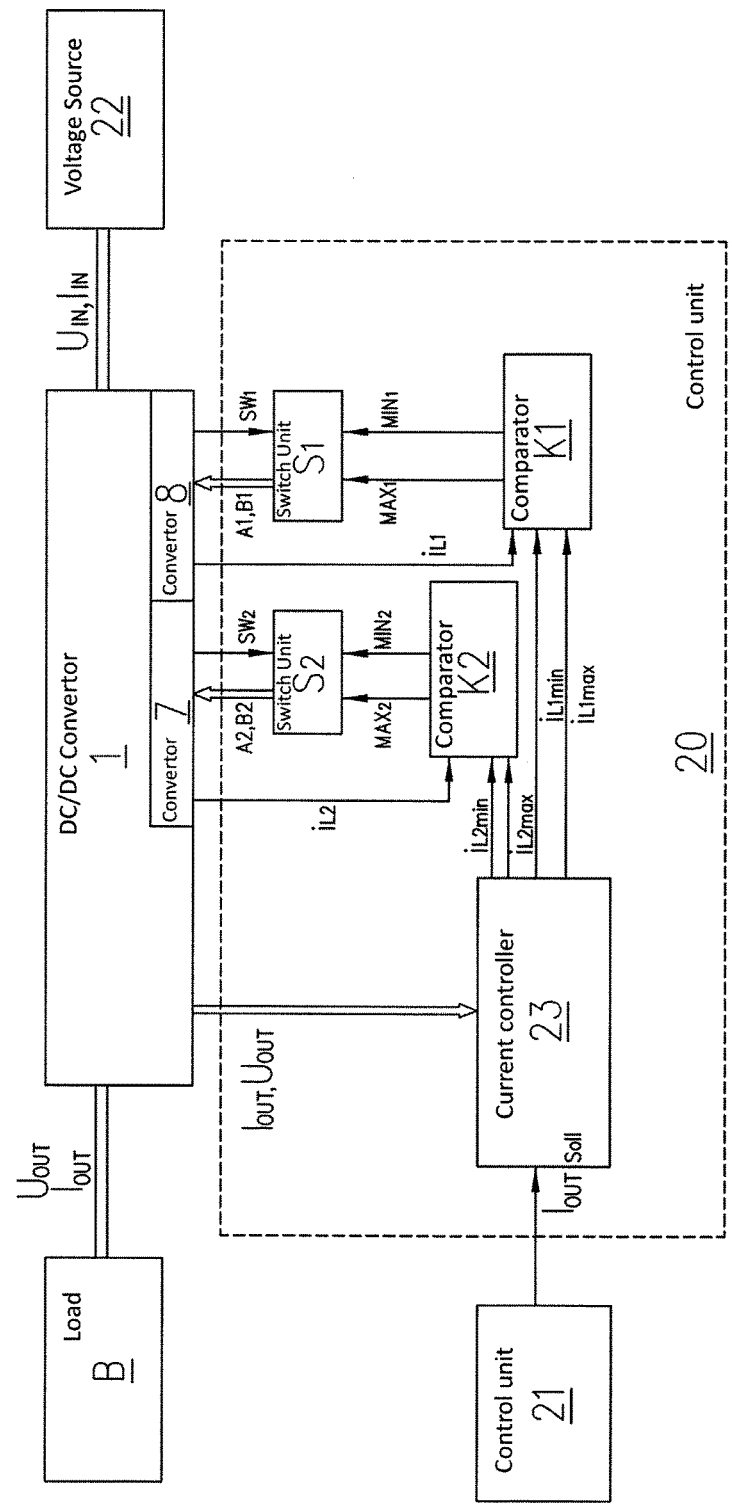
FIG. 12 shows a control concept for controlling the DC/DC converter according to the invention.

The control concept of the DC/DC converter according to the invention 1 is explained in the following on the basis of FIG. 12. The DC/DC converter 1 is connected here to a direct-current voltage source 22, e.g., a DC intermediate circuit of a photovoltaic inverter, and supplies an electrical load B, and vice versa. For this purpose, a control loop is generally implemented in a control unit 20 that carries out the soft switching method described above. The regulation of the output current $I_{OUT}$ to a target value of the output current $I_{OUTtarget}$ predetermined by a superordinate control unit 21, e.g., a battery charging device of a battery, is done by prescribing minimum current values $i_{L1min}$, $i_{L2min}$ and maximum current values $i_{L1max}$, $i_{L2max}$ for the coil currents $i_{L1}$, $i_{L2}$ to achieve the triangular current profiles. To achieve soft switching ZVS, the minimum current values $i_{L1min}$, $i_{L2min}$ and maximum current values $i_{L1max}$, $i_{L2max}$ have different signs. Alternatively, controlling could of course also be performed to a predetermined direct-current voltage $U_{OUTtarget}$. For this purpose, a current controller 23 (or voltage controller), preferably one implemented by means of a microcontroller, of the control unit 20 converts the setpoint value ($I_{OUTtarget}$ or $U_{OUTtarget}$) into corresponding minimum current values $i_{L1min}$, $i_{L2min}$ and maximum current values $i_{L1max}$, $i_{L2max}$. The quantity of the output current $I_{OUT}$ or of the direct-current voltage $U_{OUT}$ is established on the basis of the minimum and maximum current values $i_{L1min}$, $i_{L2min}$, $i_{L1max}$, $i_{L2max}$. By setting a negative minimum current $i_{L1min}$, $i_{L2min}$ and of a positive maximum current $i_{L1max}$, $i_{L2max}$ of the coil currents $i_{L1}$, $i_{L2}$, which forces a zero crossing of the coil currents $i_{L1}$, $i_{L2}$ during a switching period, soft switching is made possible in every operating mode. Upon reaching these minimum and maximum values, the measured coil currents $i_{L1}$, $i_{L2}$ trigger the pulse patterns for the switching of the semiconductor switches G1, G2, G3, G4, for example as shown in FIG. 11. For this purpose, the measured coil currents $i_{L1}$, $i_{L2}$ of the two inverting buck-boost converters 7, 8 are each compared by an associated window comparator K1, K2 with the respective minimum current values $i_{L1min}$, $i_{L2min}$ and maximum current values $i_{L1max}$, $i_{L2max}$. When the upper or lower limit is reached, the semiconductor switches G1, G2, G3, G4 of the inverting buck-boost converters 7, 8 are switched, thus creating the asymmetrical triangular coil currents $i_{L1}$, $i_{L2}$ that swing between the predetermined upper and lower limit. The output signals MIN1, MAX1 and MIN2, MAX2 of the window comparators K1, K2 each signal the changeover points (time points t0, t4 in FIG. 10) to an associated switch control unit S1, S2, which is embodied, for example, as a programmable logic circuit. The switch control units S1, S2 generate the switching pattern for the semiconductor switches G1, G2, G3, G4 while specifying the soft switching described above. For this purpose, the recharging process of the parasitic capacitances of the semiconductor switches G1, G2, G3, G4 is detected (as described above) and indicated to the switch control units S1, S2 via the inputs SW1, SW2. The semiconductor switches G1, G2, G3, G4 of the respective inverting buck-boost converter 7, 8 are switched by means of the output signals A1, B1 and A2, B2 of the switch control units S1, S2.

In addition, by monitoring the voltages $U_{C1}$, $U_{C2}$ dropping at the capacitors C1, C2, the setpoints of the minimum current values $i_{L1min}$, $i_{L2min}$ and maximum current values $i_{L1max}$, $i_{L2max}$ of the two inverting buck-boost converters 7, 8 can be regulated in order to maintain the symmetry of the inverting buck-boost converters 7, 8. To this end, appropriate measuring units for detecting the voltages $U_{C1}$, $U_{C2}$ can be installed in the DC/DC converter 1. The control setting is therefore $U_{C1}=U_{C2}$, which can optionally also be ensured by the current controller 23.

The minimum current values $i_{L1min}$, $i_{L2min}$ and maximum current values $i_{L1max}$, $i_{L2max}$ are the four manipulated variables of the control unit 20, with the aid of which four control conditions can be met:

Regulation of the output current $I_{OUT}$ (or of a direct-current voltage $U_{OUT}$ at the output) to the predetermined target value $I_{OUT,target}$ ($U_{OUT,target}$) That is the main function of the control unit 20.

Voltage regulation of the voltages applied to the capacitors C1, C2 for symmetry $U_{C1}=U_{C2}$. This function is preferably implemented in order to ensure or maintain symmetry.

Phase regulation of the coil currents $i_{L1}$, $i_{L2}$ to the desired phase shift of preferably 180°. The Phase shift of 180° is desirable when an output current $I_{OUT}$ with low current fluctuations is to be implemented. In principle, any phase shift between 0° and 180° is conceivable.

Current peak regulation of the coil currents $i_{L1}$, $i_{L2}$ for defined zero crossings (time points t3, t7 in FIG. 11) in order to preferably implement soft switching.

The detection of the analogous measured variables required for this, such as $I_{OUT}$, $U_{OUT}$, $U_{IN}$, $i_{L1}$, $i_{L2}$, $U_{C1}$ and $U_{C2}$, can be done via the measuring units and subsequent analog-digital conversion integrated into the DC/DC converter 1. The phase difference between the coil currents $i_{L1}$, $i_{L2}$ can be achieved in the current regulator 23 through timer functions. Since the switching of the coil currents $i_{L1}$, $i_{L2}$ upon reaching the minimum current values $i_{L1min}$, $i_{L2min}$ and maximum current values $i_{L1max}$, $i_{L2max}$ is very time-critical, this part of the control is preferably implemented outside of the current regulator 23 with the aid of fast analog comparator modules K1, K2, as shown in FIG. 12.

In principle, the above-described method for actuating the semiconductor switches G1, G2, G3, G4 and the control concept can also be used for other known topologies of a DC/DC converter 1 and, accordingly, is not limited to the DC/DC converter 1 according to the invention. A precondition for this is that two interconnected DC/DC converter units, such as inverting buck-boost converters 7, 8 like in the inventive DC/DC converter 1 according to FIG. 1 or synchronous converters like in the prior art mentioned at the outset, be contained in the DC/DC converter 1 that are connected via a common capacitor C3 to the output of the DC/DC converter 1. The second direct-current voltage $U_{OUT}$ of the DC/DC converter 1 is applied to the capacitor C3, and the common capacitor C3 is part of the first DC/DC converter unit and second DC/DC converter unit.

Depending on the specific application, chokes can also be used instead of coils L1, L2. This is the case, for example, if a battery with an output in the range of 1 kW to 5 kW is connected to the output as an electrical load B, the first voltage $U_{IN}$ is applied to the input in the range of about 300 V to 1000 V, and the second voltage $U_{OUT}$ is applied to the output in the range of about 50 V to 200 V. Given that the DC/DC converter 1 is constructed so as to be bidirectional, the input voltage can also be defined accordingly as output voltage, and vice versa.

The invention claimed is:

1. A DC/DC converter for converting a first direct-current voltage into a second direct-current voltage, and vice versa, wherein a capacitor series connection of at least three capacitors is provided in the DC/DC converter, wherein a first capacitor and middle third capacitor of the capacitor series connection are part of a first inverting buck-boost converter and a second capacitor and the middle third capacitor of the capacitor series connection are part of a second inverting buck-boost converter, wherein the first direct-current voltage is applied to the capacitor series connection and the second direct-current voltage is applied at the common third capacitor of the first and second inverting buck-boost converter.

2. The DC/DC converter as set forth in claim 1, wherein the capacitance of the third capacitor is greater than the sum of the capacitances of the first capacitor and of the second capacitor.

3. The DC/DC converter as set forth in claim 2, wherein the capacitance of the third capacitor is at least twice as large as the sum of the capacitances of the first capacitor and of the second capacitor.

4. The DC/DC converter as set forth in claim 1, wherein the first capacitor and second capacitor are of equal capacitance.

5. The DC/DC converter as set forth in claim 1, wherein the inductance values of the first coil and second coil are selected such that the coil currents change signs via the first and second coil during a switching period of the semiconductor switches.

6. The DC/DC converter as set forth in claim 1, wherein a measurer for measuring the coil currents is arranged in series to the first coil and second coil, respectively.

7. The DC/DC converter as set forth in claim 1, wherein, to form the first inverting buck-boost converter, a bridge circuit composed of a first switch series circuit with at least one first and second semiconductor switch, a series connection composed of the first and third capacitor, and an electrical connection as a bridge arm, in which a first coil is arranged, are provided and that, to form the second inverting buck-boost converter, a bridge circuit composed of a second switch series circuit with at least one third and fourth semiconductor switch, a series connection composed of the second and third capacitor, and an electrical connection as a bridge arm, in which a second coil is arranged, are provided.

8. A method for regulating a DC/DC converter for converting a first direct-current voltage into a second direct-current voltage, and vice versa, in which the second direct-current voltage is applied to a capacitor and two DC/DC converter units, each with at least one coil, at least two semiconductor switches and at least one capacitor are arranged in the DC/DC converter, and the two DC/DC converter units are interconnected as a result of the two DC/DC converter units sharing the capacitor to which the second direct-current voltage is applied, the semiconductor switches of the DC/DC converter units being switched alternatingly during successive switching periods, minimum current values and maximum current values being prescribed for the coil currents via the coils of the DC/DC converter units and the minimum current values and maximum current values having different signs, and the switching of the semiconductor switches of the DC/DC converter units each being triggered when the associated minimum current value or maximum current value is reached by the respective coil current.

9. The method as set forth in claim 8, wherein the semiconductor switches are switched off when the associated minimum current value or maximum current value is reached.

10. The method as set forth in claim 8, wherein, by specifying the minimum current values and/or the maximum current values, a predetermined output current or a predetermined direct-current output voltage is set at the output of the DC/DC converter.

11. The method as set forth in claim 8, wherein the semiconductor switches of the two DC/DC converter units are actuated in a phase-shifted manner.

12. The method as set forth in claim 8, wherein the semiconductor switch is switched alternatingly with the semiconductor switch and the semiconductor switch is switched alternatingly with the semiconductor.

13. The method as set forth in claim 12, wherein the semiconductor switches are switched such that at least the second semiconductor switch or the fourth semiconductor switch is always conductive.

14. The method as set forth in claim 8, wherein a capacitor series connection with the common capacitor and additional first and second capacitor is provided in the DC/DC converter, wherein, by specifying the minimum current values and/or the maximum current values, the voltages dropping at the first capacitor and second capacitor of the capacitor series connection are matched to one another.

15. The method as set forth in claim 8, wherein semiconductor switches are switched on after a respective antiparallel semiconductor switch diode has become conductive.

* * * * *